April 21, 1925.
C. F. CRAIG
1,534,361
BLOCK MAKING MACHINE
Filed April 16, 1923
2 Sheets-Sheet 1
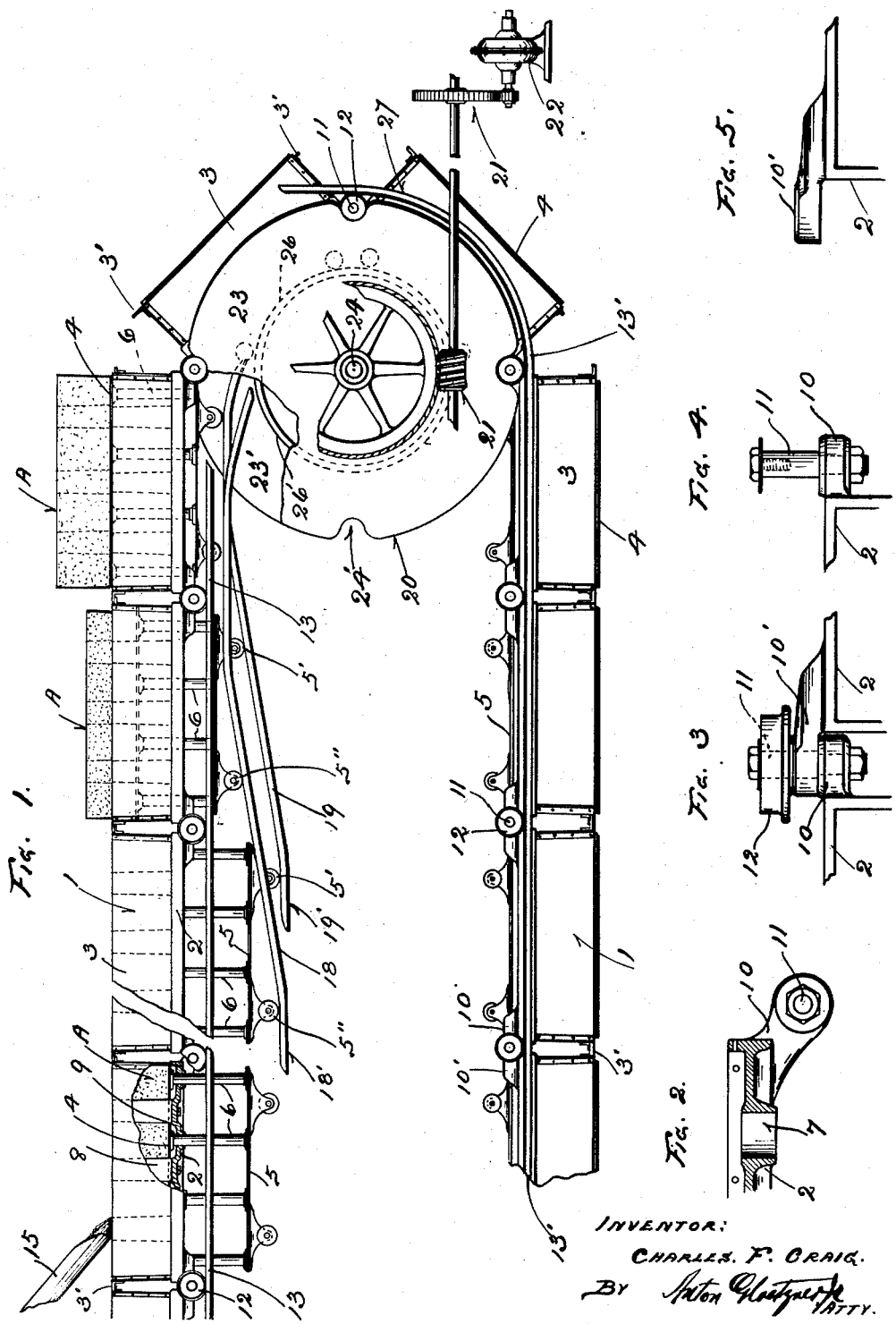
INVENTOR:
CHARLES. F. CRAIG.
BY Anton Glatzpetje
ATTY.

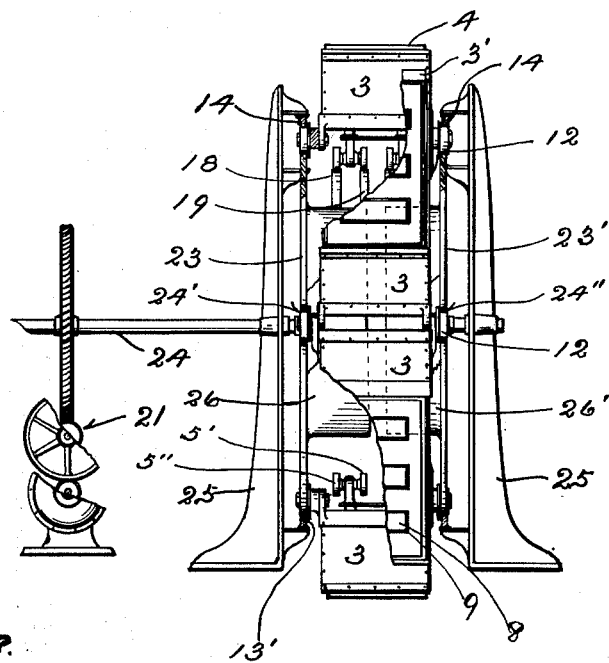
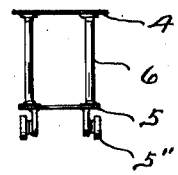
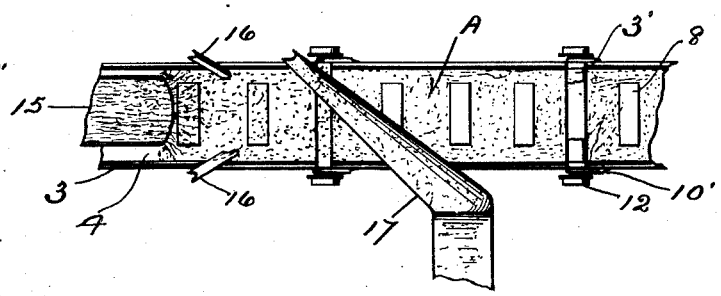
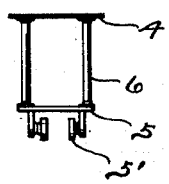

Patented Apr. 21, 1925.

1,534,361

UNITED STATES PATENT OFFICE.

CHARLES F. CRAIG, OF LOS ANGELES, CALIFORNIA.

BLOCK-MAKING MACHINE.

Application filed April 16, 1923. Serial No. 632,323.

*To all whom it may concern:*

Be it known that I, CHARLES F. CRAIG, a citizen of the United States, residing at Los Angeles, county of Los Angeles, and State of California, have invented a certain new and useful Block-Making Machine, of which the following is a specification.

This invention relates to a machine for producing blocks and it has particular reference to an automatic means for making blocks, bricks and similar units, the object of the invention being to provide a simple means in which plastic and especially viscous material, as plaster of Paris, gypsum and the like, in a semi-liquid condition, may be molded into suitable blocks in a continuous manner and automatically removed from the molds after attaining a degree of hardness and dryness that will enable them to be self sustaining.

The invention comprises such other features incident to the performance of the objects set out as are complementary to a machine of the type noted and includes the mechanical arrangements for carrying out the steps of the block making seriatim, all with the end in view of producing blocks and like units in a continuous manner from plastic material.

These objects are accomplished by the form of device shown in the accompanying drawings, in which—

Fig. 1 is a side elevation of one end of a machine made according to this invention.

Fig. 2 is a fragmentary side view of one of the extensions of one of the bases.

Fig. 3 is a fragmentary plan view showing the pivotal connection of two molds with a wheel support.

Fig. 4 is a plan view showing a trunnion axle in position.

Fig. 5 is a fragmentary view of one of the extensions of one of the bases.

Fig. 6 is an end view of Fig. 1.

Fig. 7 is a fragmentary plan view showing the molds, the charging chute, and the leveling means.

Fig. 8 is a rear view of one of the pallets and carriages of one of the molds, and Fig. 9 is a front view of the same.

My invention comprises a plurality of molds or receptacles, conjoined to have relative pivotal movement and provided with means for ejecting therefrom a hardened or semi-hardened mass of suitable material deposited therein, with means for operating said ejecting means.

Each mold 1, of the series consists of a base 2 and preferably a rectangular enclosure or frame 3, secured upon the base and forming the sides and ends of the mold; the ends of the frames 3 being provided with projecting lips 3', which, overlapping similar lips of other frames of a conjoined series, bridges the space and prevents the material falling between the molds. The bottom of each mold 1, consists preferably of a movable pallet 4, upon which the molding material is deposited and carried. This pallet 4 is connected with a wheeled carriage 5, by guide rods 6, which extend through and are operable in guide ways 7, in the base 2, during the process of ejecting the contents of the molds, by the means pointed out hereafter.

Suitable cores 8 may be provided where the manufacture of hollow or substantially hollow blocks is desired and such cores 8 may be secured in any suitable manner upon the base 2, and extend through openings 9 provided for the purpose in the pallets 4.

Each base 2 is formed or provided with apertured end extensions 10 and 10', arranged to interfit with similar extensions of other bases. In order to enable the bases 2 to swing relatively to each other, these interfitting extensions are conjoined preferably by trunnion axles 11, secured in the extensions 10, and upon which are journaled suitable wheels 12, which are arranged to travel upon lower or upper rails 13 and 14, respectively, spaced sufficiently to permit easy revolution of said wheels upon either rails as required, the necessity therefor appearing hereafter. The pallet 4 of each mold 1 is held in normal position, that is, against the upper face of the base 2, by the weight of itself and its complementary parts, as described.

The molds 1, with the pallets in the bottoms thereof are arranged to be drawn along the rails 13 continuously in the manner presently described, while the material, deposited thereinto through a suitable chute 15, and leveled by the devices generally indicated at 16 and 17, stationarily positioned with respect to the moving molds, is gradually approaching a degree of hardness or consistency which will permit the removal of the formed block. The upward movement of the pallets in the molds 1, is effected by a plurality of inclined rails 18 and 19, respectively, so disposed that the front wheels 5' of the carriage 5 will begin ascent of said rails simultaneously with the rear wheels 5". To effect this, the front wheels 5' are placed closer together than the rear wheels 5", and the inclined rails 18 lie within the transverse plane of the rails 19.

For a short distance in advance of the main inclines of the rails 18 and 19, said rails are inclined, as seen at 18' and 19', respectively, Fig. 1, sufficiently only to effect the initial dislodgment of the formed mass from the sides and ends of the molds.

To resist the possible upward movement of the molds during the process of ejection of the contents thereof, the thrust rail 14 is provided and it extends in the same, but higher, parallel plane as the lower or main rail 13 and for a distance equal to the time required for the complete elevation of the block from the mold. The block is then removed from the pallet and placed where complete drying and hardening may take place.

As seen in Fig. 1, the molds are joined together to constitute substantially an endless chain, the main rails 13 and 13' supporting the molds while traveling horizontally. The continued movement of said endless molds may be effected by a suitable means, as for instance a wheel 20, constructed as presently described and set in motion through suitable transmission elements 21, deriving power from a suitable source, as a prime mover 22.

Said wheel 20 functions substantially as a sprocket to transfer the molds from the upper to the lower rails, and it may consist of two disks 23 and 23', mounted upon a shaft 24, journaled in a suitable support 25. The disks 23 and 23' are provided with peripheral indentations 24 and 24', shaped to conform to the wheels 12 upon which the molds are carried, and to receive said wheels immediately upon their leaving the upper rails 13, which terminate, as seen in Fig. 1, at a convenient tangent to said disks 23 and 23' such dislodgment before hardening being made necessary by the sticky quality of the plaster. Similarly the rails 18 and 19, respectively, terminate at proper tangents to annular surfaces 26 and 26' integral with the disks 23 and 23', respectively, in order that the front wheels 5' and the rear wheels 5" of each carriage 5 may have a constant support and maintain the pallet in elevated position while the mold is being transferred over the wheel 20 from the rail 13 to the rail 13'.

The rail 13' is upwardly curved at the end thereof, as seen at 27, and forms a support for the molds during the traverse of the same with the wheels 20.

What I claim, is:

1. An apparatus for forming hollow blocks from viscous plaster, comprising a plurality of molds conjoined to have relative pivotal movement, a track upon which the molds are movable, each mold provided with a plurality of vertical cores, a pallet in each mold provided with openings through which said cores extend, a carriage for each mold, means to support said pallet above and connect said pallet with said carriage, and an inclined track disposed in the path of said carriage to elevate the pallet and eject the block from the mold by gradual movement, said track having an initial incline to produce a very slight gradual movement of the pallets and effect the initial breakage of the cohesion between the block and the mold.

2. An apparatus for forming hollow blocks from viscous plaster comprising a plurality of molds conjoined to have relative movement and each mold provided with end lips arranged to overlap similar lips of other molds and seal the space between the molds, cores carried by said molds, pallets within said molds upon which the viscous plaster is deposited, wheeled carriages, guide rods connecting said wheeled carriages with said pallets, means to elevate said pallets while the molds are in continuous motion, comprising rails inclined to the horizontal and at the pitch required to lift the block to the top of the mold, said rails formed with an initial incline to effect a slight initial movement of said pallets to break the adhesion of the sticky plastic substance, and means to hold the molds against movement during the ejection of the block.

In testimony whereof I have set my hand.

CHARLES F. CRAIG.